US008145550B2

(12) United States Patent
Maw et al.

(10) Patent No.: US 8,145,550 B2
(45) Date of Patent: *Mar. 27, 2012

(54) FIELD 55 DATA RELATIONSHIPS

(75) Inventors: Brian Maw, Belmont, CA (US); Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/050,192

(22) Filed: Mar. 17, 2011

(65) Prior Publication Data

US 2011/0225075 A1 Sep. 15, 2011

Related U.S. Application Data

(63) Continuation of application No. 12/156,923, filed on Jun. 5, 2008, now Pat. No. 7,962,390.

(51) Int. Cl.
*G06Q 40/00* (2012.01)
(52) U.S. Cl. .......................................... 705/35; 705/39
(58) Field of Classification Search .................... 705/35, 705/39
See application file for complete search history.

(56) References Cited

U.S. PATENT DOCUMENTS

| 4,114,027 A | 9/1978 | Slater et al. |
| 6,325,285 B1 | 12/2001 | Baratelli |
| 7,318,049 B2 | 1/2008 | Iannacci |
| 7,356,541 B1 | 4/2008 | Doughty |
| 7,962,390 B2 | 6/2011 | Maw et al. |
| 2003/0121969 A1 | 7/2003 | Wankmueller |
| 2003/0167207 A1 | 9/2003 | Berardi et al. |
| 2004/0128243 A1 | 7/2004 | Kavanagh et al. |
| 2005/0018670 A1 | 1/2005 | Shigematsu et al. |
| 2005/0080726 A1 | 4/2005 | Krajewski et al. |
| 2006/0004746 A1 | 1/2006 | Angus et al. |
| 2006/0022033 A1 | 2/2006 | Smets et al. |
| 2007/0055630 A1 | 3/2007 | Gauthier et al. |
| 2007/0136211 A1 | 6/2007 | Brown et al. |
| 2008/0040285 A1 | 2/2008 | Wankmueller |
| 2008/0058014 A1 | 3/2008 | Khan et al. |
| 2008/0103968 A1 | 5/2008 | Bies et al. |
| 2009/0140839 A1 | 6/2009 | Bishop et al. |
| 2009/0265273 A1 | 10/2009 | Guntupalli et al. |

FOREIGN PATENT DOCUMENTS

KR 10-0795142 B1 1/2008
WO WO 2006/077281 A1 7/2006

OTHER PUBLICATIONS

International Search Report and Written Opinion from PCT/US2009/041961, dated Nov. 30, 2009 (11 pages). International Search Report from PCT/US2008/076770, dated Nov. 18, 2008 (3 pages).
International Search Report from PCT/US2009/046402, dated Jul. 23, 2009 (2 pages).
Office Action dated Mar. 16, 2011 from U.S. Appl. No. 12/431,452, 7 pages.
Kennedy, Kristen; "The Incredible Shrinking Form Factor"; 2002, CRN, vol. 996, pp. 46-50.

*Primary Examiner* — Thomas Dixon
*Assistant Examiner* — Benjamin S Fields
(74) *Attorney, Agent, or Firm* — Kilpatrick Townsend & Stockton LLP (57) ABSTRACT

A data mining device, method, and apparatus configured to associate customer exclusive data from a payment card or device after a financial transaction. A financial transaction processing system comprises a report distribution management system, a data relationship manager, and a customer exclusive data association database. The report distribution management system receives financial transaction data. The data relationship manager determines an issuer associated with the financial transaction data, queries a subscription database for subscription data associated with the issuer and a core database for the issuer processing parameters. The processing parameters are applied to the financial transaction data and the subscription data. A customer exclusive data association database is updated with the financial transaction data once the processing parameters are applied.

20 Claims, 8 Drawing Sheets

| Tag # | 9F02 | 9F37 | 9F36 | 9F10 | 9F26 | 9F7C | 9F6E |
|---|---|---|---|---|---|---|---|
| Field Name | Amount Authorized | Unpredictable Number | Application Transaction Count (ATC) | Issuer Application Data (IAD) | Application Cryptogram | Customer Exclusive Data | Form Factor Identifier |
| | 3010 | 3020 | 3030 | 3040 | 3050 | 4000 | 6000 |

FIG. 3

| 4100 | 4200 | 4300 |
|---|---|---|
| TLV Format | | |
| Tag (Position Number) | Length | Data |

FIG. 4A

| Application Cryptogram Example for CVN 17 in Field 55 | | |
|---|---|---|
| 9F26 | 8 | 123F76A4319C4321 |
| 4100 | 4200 | 4300 |

| Device Indicator Value | Form Factor | Description |
|---|---|---|
| 0 | Full-size standard card (non-contactless) | Device indicator value initiated from a full-size magnetic stripe card |
| 1 | Full-size standard card | Device indicator value initiated from a full-size contactless card (contactless) MSD chip and magnetic stripe) |
| 2 | Standard mini card (non-contactless) | Device indicator value initiated from a standard mini card |
| 3 | Contactless mini card | Device indicator value initiated from a contactless mini card (contactless MSD chip and magnetic stripe) |
| 4 | Micro tag | Device indicator value initiated from the contactless MSD chip of a Micro tag |
| 5 | Mobile device | Device indicator value initiated from the contactless MSD chip of a mobile device |
| 6 | Alternate card user | Reserved for alternate card user |
| 7 | Alternate card user | Reserved for alternate card user |
| 8 | Alternate card user | Reserved for alternate card user |
| 9 | Reserved | Reserved for future payment device |

FIELD 55 DATA RELATIONSHIPS

CROSS-REFERENCES TO RELATED APPLICATIONS

The present application is a continuation application of and claims priority to U.S. patent application Ser. No. 12/156,923, filed on Jun. 5, 2008, the entire contents of which are herein incorporated by reference for all purposes.

BACKGROUND

Aspects of the present disclosure relate in general to the data mining of financial services. Aspects include an apparatus, system, method and computer-readable storage medium configured to associate customer exclusive data from a payment card or device after a financial transaction. The customer exclusive data may be integrated with a financial transaction fraud prevention engine.

Traditionally, credit card issuers offer many different types of incentives to encourage cardholders to use credit cards for their purchases. For example, some credit card issuers offer cardholders frequent-flyer miles, cash back, or other combinations of rewards and rebates.

At the same time, information related to credit card purchases is often unorganized and not correlated into a usable form for credit card issuers.

BRIEF SUMMARY

Described embodiments include a system and method configured to organize and associate customer exclusive data after a financial transaction. Despite the fact that the industry does not associate such information, one aspect of the invention includes the insight that utilizing customer exclusive data after a financial transaction affords issuers, acquirers, and merchants to offer payment card users targeted promotions.

A financial transaction processing system comprises a report distribution management system, a data relationship manager, and a customer exclusive data association database. The report distribution management system receives financial transaction data. The data relationship manager determines an issuer associated with the financial transaction data, queries a subscription database for subscription data associated with the issuer and a core database for the issuer processing parameters. The processing parameters are applied to the financial transaction data and the subscription data. A customer exclusive data association database is updated with the financial transaction data once the processing parameters are applied.

DETAILED DESCRIPTION

Although the payment card industry does not currently organize and associate customer exclusive data stored on a payment card or device in a financial transaction, one aspect of the present invention includes the insight that associating customer exclusive data with financial transaction information would be useful to consumers, merchants, acquirers, card issuers, and card payment processors after the time of the transaction.

For the purposes of this document, a payment card may be any credit, debit, or financial transaction identification card capable of storing customer exclusive data.

A payment device may be any credit, debit, or financial transaction device, mobile phone, or identification card capable of storing customer exclusive data for use in a financial transaction.

A financial transaction is any operation involving a payment device, whether a payment, reimbursement, or any other interaction using a payment device. Financial transactions may include credit, debit, or charge transactions.

Embodiments of the present invention include a system, method, and computer-readable storage medium configured to parse or use customer exclusive data stored on a payment card or device in a financial transaction.

Figure 1:
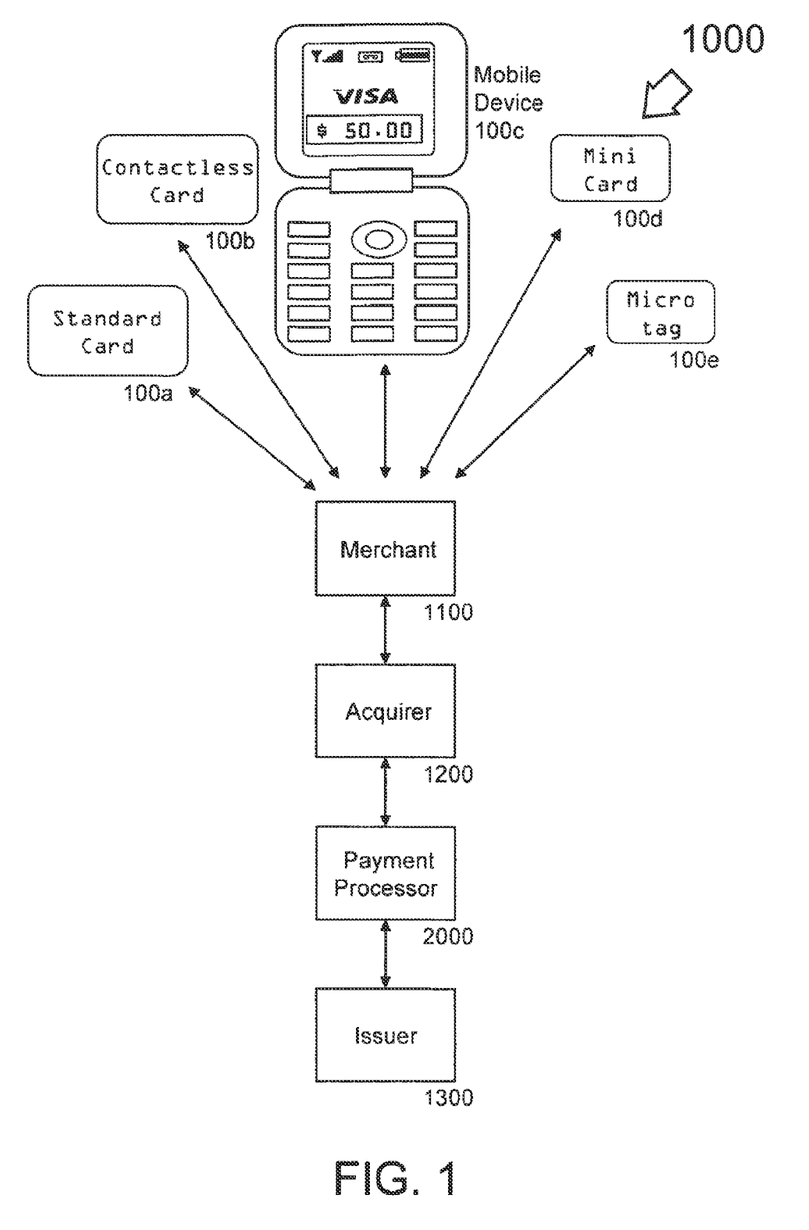
FIG. 1 illustrates an embodiment of a system configured to parse and process customer exclusive data from a payment card or device in a financial transaction.

Turning to FIG. 1, this figure depicts system 1000, configured to associate customer exclusive data with a financial transaction after the transaction has taken place, constructed and operative in accordance with an embodiment of the present invention. In this example, payment device 100 may be any credit, debit, or charge device. Examples include, but are not limited to, a standard payment device 100a, a radio frequency (also known as "contactless" or "pay wave") payment device 100b, a mobile phone device 100c, a mini-card 100d, micro tag 100e, payment fob, or any other payment device known in the art. It is understood that embodiments of the present invention may be extended to identify and track future payment devices.

When the consumer uses the payment device 100 at a merchant 1100 to pay for a product or service, the merchant 1100 contacts an acquirer 1200 (for example, a commercial bank) to determine whether the consumer is credit worthy or the account has sufficient funds on the card to pay for the transaction. The acquirer 1200 forwards the details of the payment transaction to a payment processor 2000 or payment card issuing bank 1300 ("the issuer") for processing.

Payment processor 2000 may be any payment network known in the art. Examples of payment networks include Visa™, MasterCard™, Discover™, and American Express™.

Issuer 1300 may be any financial institution or organization that issues the payment device 100.

Figure 2A:
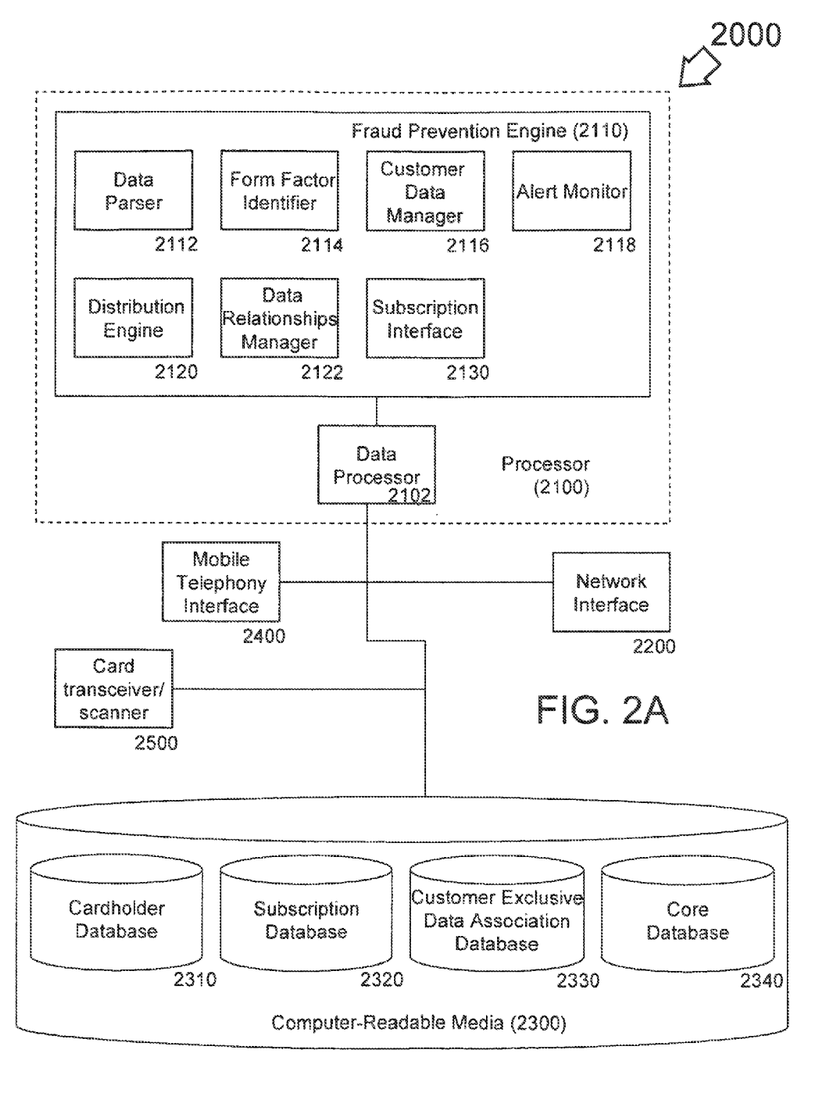
FIGS. 2A and 2B are a block diagram of a payment processor configured to parse and process customer exclusive data from a payment card or device in a financial transaction.
Figure 2B:
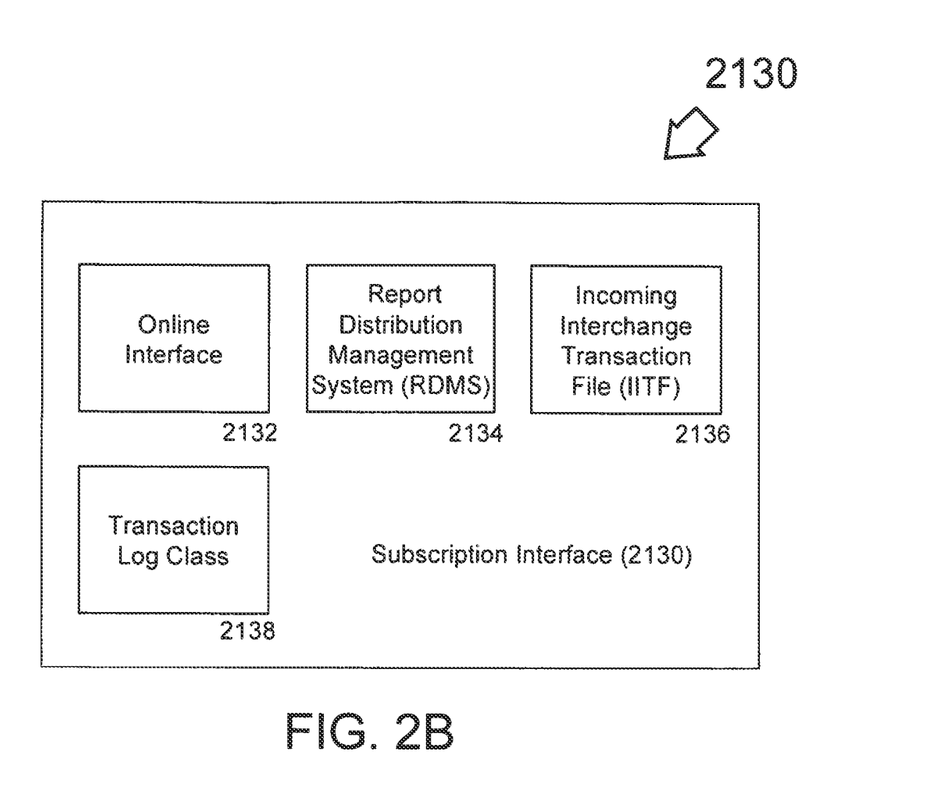

Embodiments will now be disclosed with reference to a payment processor 2000 depicted in FIG. 2, constructed and operative in accordance with an embodiment of the present invention.

Payment processor 2000 is configured to associate customer exclusive data with a financial transaction after the transaction has taken place.

It is well understood by those in the art, that the functional elements of FIG. 2 may be implemented in hardware, firmware, or as software instructions and data encoded on a computer-readable storage medium 2300.

Payment processor 2000 may run a multi-tasking operating system (OS) and include at least one processor 2100. Processor 2100 may be any central processing unit (CPU), microprocessor, micro-controller, computational device or circuit known in the art.

As shown in FIG. 2, processor 2100 is functionally comprised of a fraud prevention engine 2110 and data processor 2102. Fraud prevention engine 2110 comprises data relationship manager 2122. Fraud prevention engine 2110 may further comprise: data parser 2112, form factor identifier 2114, customer data manager 2116, alert monitor 2118, distribution engine 2120, and subscription interface 2130. Data parser 2112 is configured to receive and parse financial transaction data. Form factor identifier 2114 enables fraud prevention engine 2110 to determine the form factor of a payment device 100. Customer data manager 2116 is any structure, function, program or module that enables fraud prevention engine 2110 to communicate with a cardholder database 2310. Alert monitor 2118 allows fraud prevention engine 2110 to generate fraud alerts. Distribution engine 2120 is configured to generate transaction reports for issuers 1300. Data relationships manager 2122 associates customer exclusive data with a financial transaction after the transaction has taken place. Subscription interface 2130 allows issuers 1300 to subscribe to reports generated by distribution engine 2120. These structures may be implemented as hardware, firmware, or software encoded on a computer readable medium, such as storage media 2300. The functions of these elements are described in greater detail below.

As shown in FIG. 2B, subscription interface 2130 may further comprise an online interface 2132, a report distribution management system (RDMS) 2134, an incoming interchange transaction file (IITF) 2136, and transaction log class 2138. Online interface 2132 allows the issuer subscription interface 2130 to communicate via network interface 2200. Report distribution management system 2134 facilitates report distribution to issuers 1300. Incoming interchange transaction file 2136 is a delivery mechanism of such a report. Transaction log class 2138 creates a log file of reports generated by distribution engine 2120. These structures may be implemented as hardware, firmware, or software encoded on a computer readable medium, such as storage media 2300. The functions of these elements are described further below.

Processor 2100 interfaces with storage medium 2300, network interface 2200, card transceiver/scanner 2500, and, in some embodiments, mobile telephony interface 2400. The data processor 2102 enables processor 2100 to locate data on, read data from, and write data to, these components.

Network interface 2200 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks.

Network interface 2200 allows payment processor 2000 to communicate with issuer 1300, and may allow communication with acquirer 1200.

Computer-readable storage medium 2300 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, magneto-optical drive, optical drive, flash memory, memory stick, transistor-based memory or other computer-readable memory device as is known in the art for storing and retrieving data. Significantly, computer-readable storage medium 2300 may be remotely located from processor 2100, and be connected to processor 2100 via a network, such as a local area network (LAN), a wide area network (WAN), or the Internet. In addition, as shown in FIG. 2, storage media 2300 may also contain cardholder database 2310, subscription database 2320, customer exclusive data association database 2330, and core database 2340. Cardholder database 2310 contains cardholder information provided by issuer 1300. Subscription database 2320 contains information about the reports, alerts, and other data subscriptions that an issuer 1300 subscribes to. Customer exclusive data relationship database stores information generated by data relationships manager 2122. Core database 2340 stores the subscription options determined by issuer 1300.

Card transceiver/scanner 2500 may be any component known in the art capable of read/writing data to or from payment devices 100. For example, for conventional credit card 100a or mini-card 100d embodiments, card transceiver/scanner 2500 may read or write to a magnetic strip. Embodiments that communicate with a contactless card 100b, mobile phone 100c, and micro tag/key fob 100e include a wireless transceiver.

Mobile telephony interface 2400 is a wireless phone transceiver capable of communicating with mobile phone payment devices 100c. Wireless phone transceivers may communicate with any wireless telephony system known in the art. Such systems include, but are not limited to: digital cellular and personal communication systems (PCS). Message formats include, but are not limited to Enhanced Data Rates for Global Evolution (EDGE), General Packet Radio Service (GPRS) Wireless Internet (WAP), or any other mobile telephony standard known in the art.

The function of these structures may best be understood with respect to FIGS. 3-7, as described below.

Figure 3:
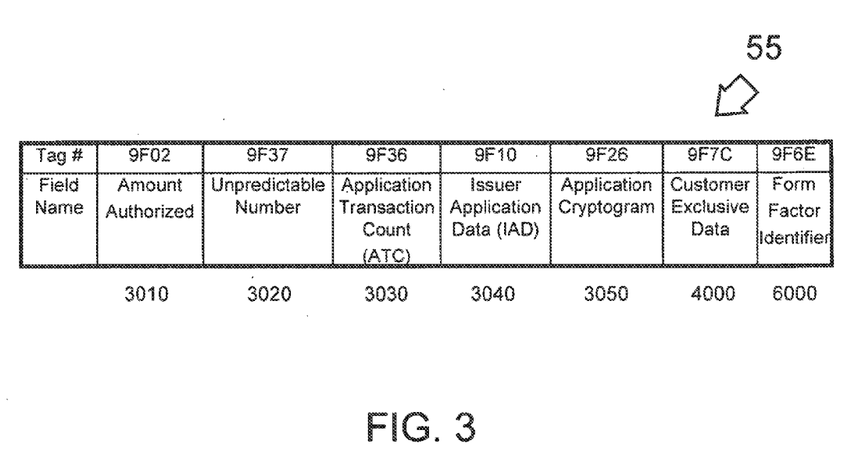
FIG. 3 is table showing an embodiment configured to store tags of information on a payment card or device.

FIG. 3 depicts a data field 55 (also referred to as "Field 55"), constructed and operative in accordance with an embodiment of the present invention. Field 55 is a memory field on payment device 100 configured to store specific transaction information. In some embodiments, the memory field is in a computer chip within payment device 100. Although implementations of Field 55 may vary in size, in some embodiments it may be limited to a maximum of 255 bytes of data. One of the features of Field 55 is the ability to allow unique personalization values in the authorization messages. These values are also known as tags (also known as "data elements") in support of contactless transactions. Field 55 tags may include data embedded in the chip that the issuer requests to receive in the authorization message.

In one embodiment of Field 55, the Field 55 data elements may include: amount authorized 3010 (tag 9F02), unpredictable number 3020 (9F37), application transaction counter (ATC) 3030 (tag 9F36), issuer application data (IAD) 3040 (tag 9F10), application cryptogram 3050 (tag 9F26), customer exclusive data 4000 (tag 9F7C), and form factor identifier 6000 (tag 9F6E). Tag 9F7C carries customer exclusive data that issuer 1300 receives in an authorization request message during contactless transactions. For the purposes of this application, we need only address customer exclusive data 4000 and form factor identifier 6000.

A data parser 2112 associated with the fraud prevention engine is configured to parse and address the Field 55 data tags. In some embodiments, data parser 2112 further performs editing, storage, distribution, monitoring, and reporting functions.

Tag 9F7C (customer exclusive data 4000) is configured to allow transport and storage of a number of different issuer and cardholder specific information.

Figure 4A:
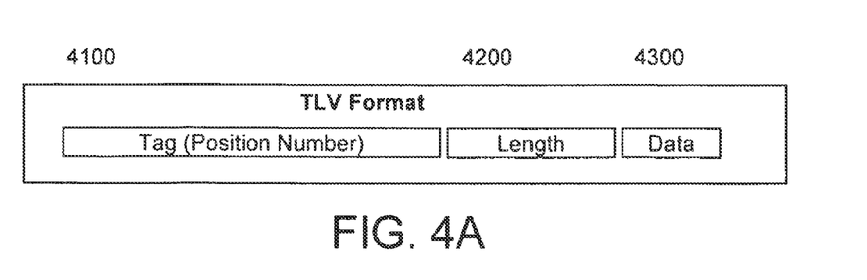
FIGS. 4A and 4B illustrating storage of customer exclusive data on a payment card or device in Tag-Length-Value format.
Figure 4B:
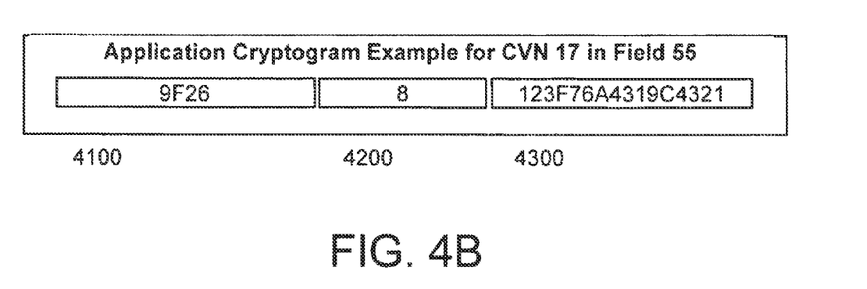

The data stored in Field 55 may be stored in any format known in the art. Some tag embodiments, as shown in FIGS. 4A and 4B store customer exclusive data 4000 and other data fields in Tag-Length-Value format, in accordance with an embodiment of the present invention. Tags 4100 indicate the position of the information, length 4200 indicates the length of the information, and a data field 4300 carries the information.

Figure 5:
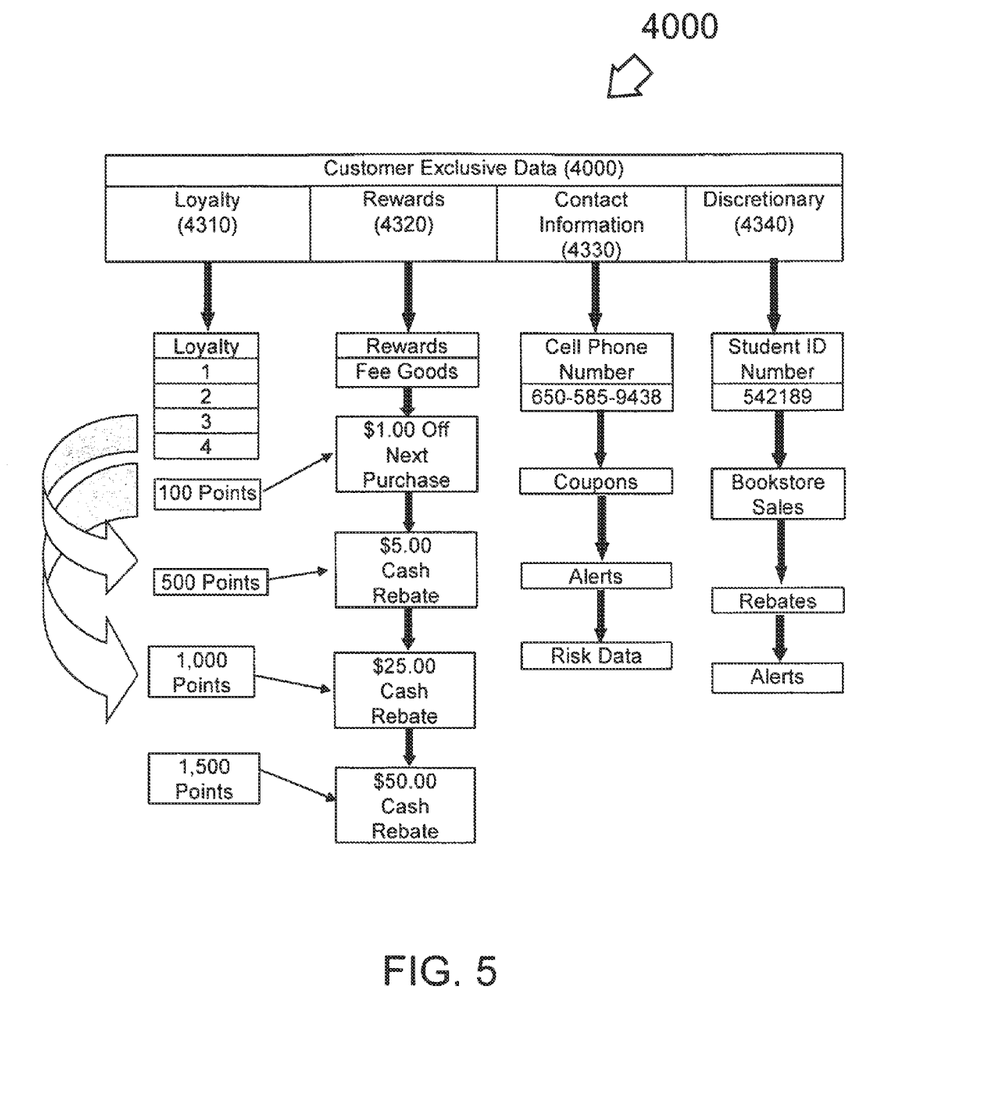
FIG. 5 illustrates examples of customer exclusive data storage on a payment card or device.

FIG. 5 illustrates examples of customer exclusive data 4000, in accordance with an embodiment of the present invention.

Examples of customer exclusive data 4000 include, but are not limited to:

Loyalty and Coupons 4310
    Instant information regarding coupons to customers while in the check out line at specific merchants.
Rewards 4320
    Instant reward information or after the fact rewards and rebates based on marketing campaigns.
    Provides flexibility that enables immediate rewards experience for the customer or following a promotional period.
Alerts and Contact Information 4330
    Available for cardholders who desire immediate knowledge of purchases over specific amounts or transactions conducted in any country.
    Will provide the avenue necessary to establish contact with the cardholder at the point of sale, or thereafter, thus providing the capability to provide coupons, rewards, alerts, etc.
    Mode of contact will utilize currently operational telephony systems and databases.
Other types of Data including issuer discretionary data 4340
    Risk Data, fraud information, exception data
    Student ID
    Drivers License Number
    Passport Number
    Social Security Number
    Library Card
    Grocery club card or store card
    Frequent Flyer Number or Airline identification
    Hotel Rewards Number or identification
    Alternate Cell Phone
    E-Mail Address
    Birthday
    Zip Code
    Name of Pet
    Type of Pet
    Vehicle Information
    Gas Card
    Travel Preferences
    Shopping Preferences Customer exclusive data 4000, as well as additional metrics, may be made available to the issuers 1300 via reports, which may be accessed on a subscription basis.

Figure 6:
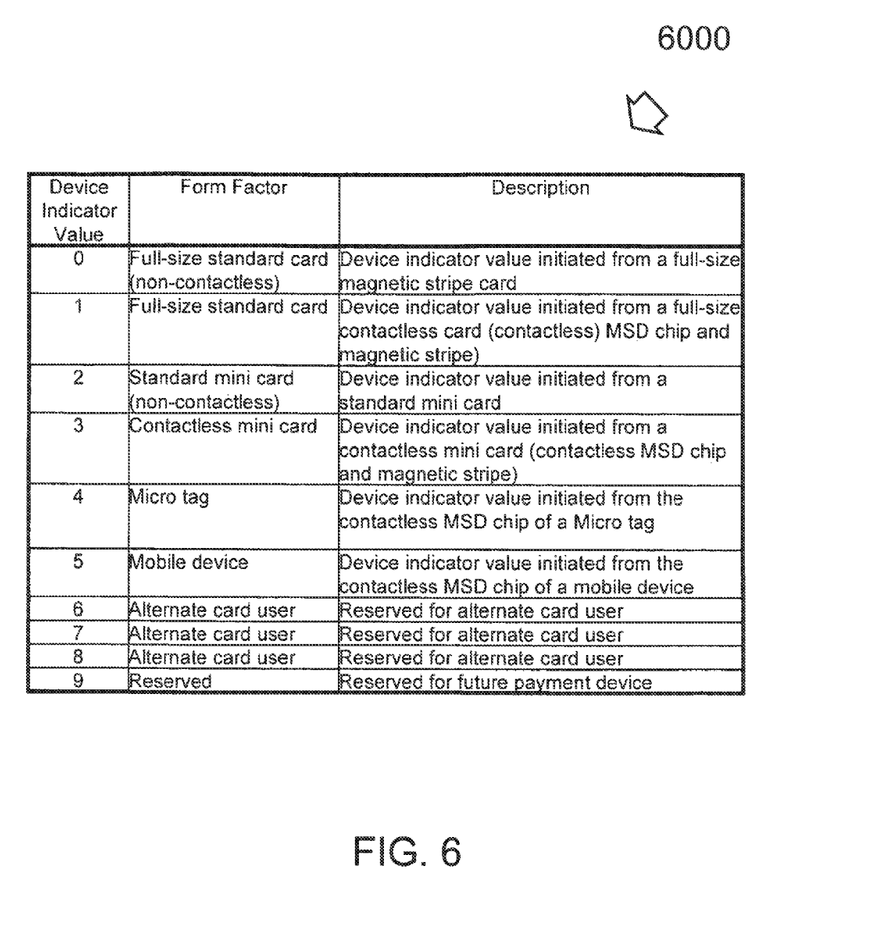
FIG. 6 depicts device form factor information stored on a payment card or device.

FIG. 6 illustrates a table showing device form factor information 6000 embodiment configured to identify the payment form factor used in a payment transaction, constructed and operative in accordance with an embodiment of the present invention. As shown, device indicator value 6000 reserves values contemplating use of full-size standard non-contactless payment cards 100a, a full-size contactless payment card 100b, a standard non-contactless mini card 100d, a contactless mini-card, a micro tag 100e, mobile device 100c, and alternate card users. It is understood that device indicator value 6000 embodiments may include some or all of such form factors.

Figure 7:
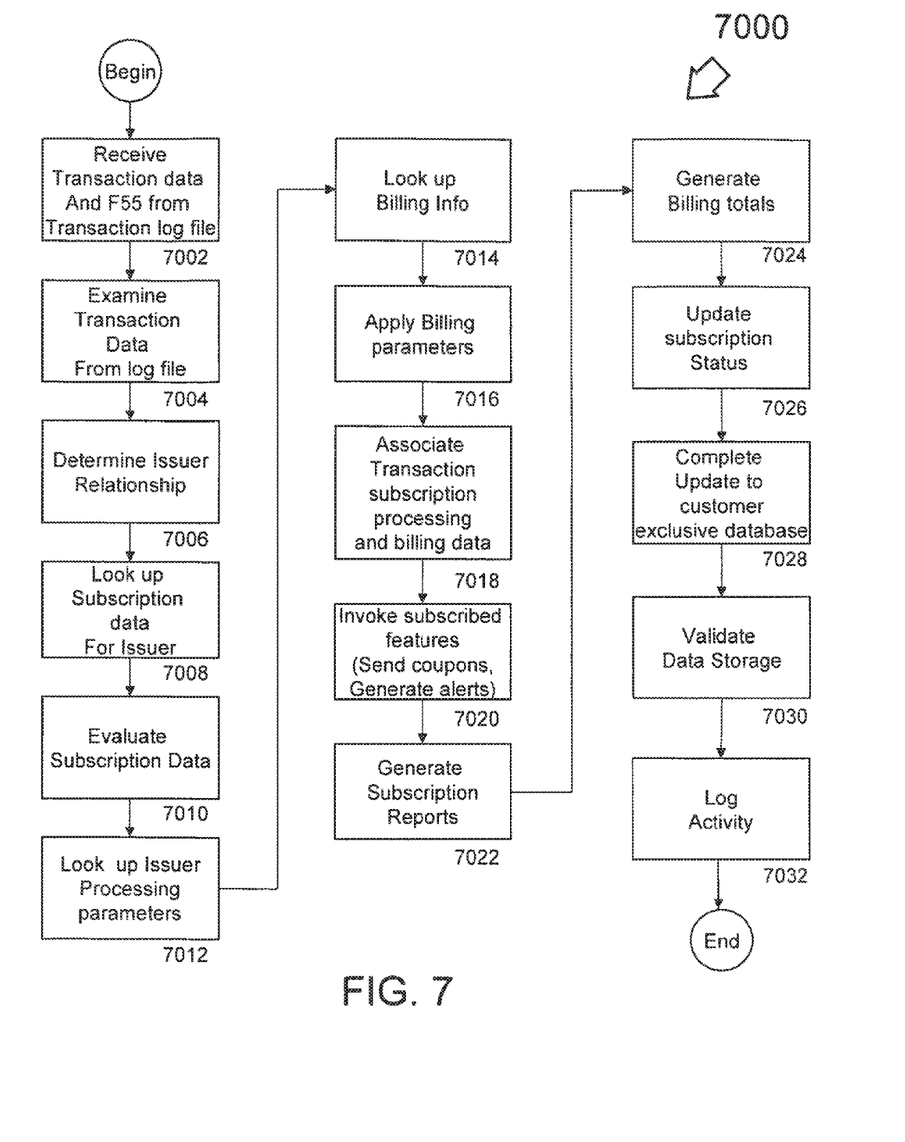
FIG. 7 flow charts a process in which customer exclusive data from a payment card or device is organized and stored after a financial transaction.

We now turn our attention to a method 7000 embodiment of the present invention, FIG. 7. It is understood by those known in the art that instructions for such method embodiments may be stored on their respective computer-readable memory 2300 and executed by their respective processors 2100.

Method 7000 involves the relationship and interactions between the data parser 2112, data relationships manager 2122, subscription database 2320, core database 2340, and the customer exclusive data association database 2330. As a real-time Field 55 enabled transaction comes into fraud prevention engine 2110, the transaction information will be fed from the data parser 2112 into a repository (2600). At this point, the process is all offline, and not part of the authorization process. With the transaction data populated in the data relationships manager 2122, the data relationships manager 2122 will begin the process of intelligently managing the data relationships between various systems. For example, as shown in FIG. 2, the manager will query and derive information from the subscription database 2320, and will intelligently merge the pertinent subscription data with the already present transaction data. The data relationships manager 2122 will also use this function to interface with other fraud prevention systems, in order to assemble a thorough, complete, and consolidated database from which to offer value-added services both to internal and external users.

FIG. 7 is a flow chart describing a method of associating customer exclusive data with a financial transaction after the transaction has taken place, in accordance with an embodiment of the present invention.

As mentioned above, cardholders initiate a purchase or another financial transaction when they use the payment device 100 at a merchant 1100. Merchant 1100 contacts an acquirer 1200 (for example, a commercial bank) to determine whether the consumer is credit worthy or the account has sufficient funds on the card to pay for the transaction. The acquirer, 1200 forwards the details of the payment transaction to a payment processor 2000 or payment card issuing bank 1300 ("the issuer") for processing. The contact is made through a financial data packet which encapsulates the details of the payment transaction, including the type and amount of the financial transaction, the cardholder's primary account number (PAN), and customer exclusive data 4000. After the transaction is approved or rejected by issuer 1300, the transaction is logged in cardholder database 2310 with the customer exclusive data 4000 by transaction log class 2138.

Process 7000 commences at block 7002, after the financial transaction has taken place. At block 7002, Report Distribution Management System 2134 receives the financial transaction data and field 55 data from the transaction log class 2138. The transaction data is extracted and examined at block 7004.

Next, process 7000 determines what data is wanted by the issuer 1300 in the form of data and report subscriptions. For any given financial transaction, the issuer 1300 relationship is determined, block 7006. Data relationships manager 2122 looks up issuer 1300 subscription data from the subscription database 2320, block 7008, and evaluates the subscription data at block 7010. Issuer subscription data may include but not be limited to a list of reports, frequency of delivery, list of alerts and conditions under which they will be processed, transaction thresholds, preference data for customer contact, such as cell phone (primary, secondary, back-up, etc.), e-mail (primary, secondary), list of loyalty programs, conditions for assigning rewards, list of coupons, timeline for promotional periods, list of data available to acquirers or merchants, list of tags to be included on reports, conditions to produce risk or fraud reports, and currency preference.

Data relationships manager 2122 queries the core database 2340 to determine the issuer 1300 subscription processing parameters, block 7012. Processing parameters may include, but not be limited to: the routing information for the issuer, acquirer, or merchant, processing and settlement window timeline, file preferences, stand-in parameters, data storage timeframe, recovery parameters, timeout parameters, failover conditions, and contact information for support staff.

In some embodiments, issuer 1300 is billed for the data processing associated with transaction routing, cryptogram validation, reporting, file delivery, field 55 processing, and any specific use of customer exclusive data or form factor indicator. Data relationships manager 2122 queries the core database 2340 for issuer 1300 billing parameters, block 7014, and the parameters are applied at block 7016.

For each financial transaction, the financial transaction data is associated with the customer exclusive data, processed and billed to the issuer, block 7018.

When various subscription features are designated by the core database 2340, these features are invoked, block 7020. Example features include generating alerts through the alert monitor 2118, sending cardholders coupons, generating and delivering reports, applying loyalty programs, and assigning cardholder rewards.

The issuer's subscription reports are generated at 7022, and the bills for the reports are calculated at block 7024.

At block 7026, the issuer subscription status is updated in the core database 2340 with information that tracks how many loyalty programs were fulfilled, coupons produced, reports generated, and any processing related to subscribed items.

An update is performed to the customer exclusive data association database 2330, block 7028, and the update is validated to ensure all data processed, including the subscription, billing, reporting, field 55, customer exclusive data and file delivery completed without any failure conditions. If error conditions occur, such as invalid data formats, or processes that do not complete, they will be logged and reported.

Finally, a data log detailing process 7000 is recorded, block 7032.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A method of processing a financial transaction, the method comprising:
   receiving financial transaction data;
   determining an issuer associated with the financial transaction data;
   querying a subscription database for subscription data associated with the issuer, the subscription database being stored on a computer-readable medium, the subscription data associated with the issuer including data the issuer wishes to receive;
   querying a core database for processing parameters associated with the issuer, the processing parameters associated with the issuer including parameters for processing the financial transaction data and the subscription data;
   applying the processing parameters to the financial transaction data and the subscription data; and
   updating a customer exclusive data association database with the financial transaction data once the processing parameters are applied, the customer exclusive data association database including data specific to a customer associated with the financial transaction.

2. The method of claim 1 wherein the financial transaction data contains field 55 data.

3. The method of claim 2 further comprising:
   associating the field 55 data with a customer record in the customer exclusive data database, the customer exclusive database being stored on a computer-readable medium; and
   updating the customer record with the associated field 55 data.

4. The method of claim 3 wherein the subscription data includes: a list of reports, frequency of delivery, list of alerts and conditions under which they will be processed, transaction thresholds, preference data for customer contact, a list of loyalty programs, conditions for assigning rewards, a list of coupons, timeline for promotional periods, a list of data available to acquirers or merchants, a list of tags to be included on reports, conditions to produce risk or fraud reports, or currency preference.

5. The method of claim 4 wherein the processing parameters include: issuer routing information, acquirer routing information, merchant routing information, processing timeline, settlement window timeline, file preferences, stand-in parameters, data storage timeframe, recovery parameters, timeout parameters, failover conditions, or support staff contact information.

6. The method of claim 5 further comprising:
   querying the core database for issuer billing parameters associated with the processing parameters.

7. The method of claim 6 further comprising:
   billing the issuer for applying the processing parameters.

8. A system of processing a financial transaction, the system comprising:
   a report distribution management system configured to receive financial transaction data;
   a data relationship manager configured to determine an issuer associated with the financial transaction data, to query a subscription database for subscription data associated with the issuer, the subscription database being stored on a computer-readable medium, to query a core database for processing parameters associated with the issuer, and to apply the processing parameters to the financial transaction data and the subscription data; and
   a customer exclusive data association database configured to update the financial transaction data once the processing parameters are applied.

9. The system of claim 8 wherein the financial transaction data contains field 55 data.

10. The system of claim 9 wherein the data relationship manager further associates the field 55 data with a customer record in the customer exclusive data database, the customer exclusive database being stored on a computer-readable medium, and the data relationship manager is configured to update the customer record with the associated field 55 data.

11. The system of claim 10 wherein the subscription data includes: a list of reports, frequency of delivery, list of alerts and conditions under which they will be processed, transaction thresholds, preference data for customer contact, a list of loyalty programs, conditions for assigning rewards, a list of coupons, timeline for promotional periods, a list of data available to acquirers or merchants, a list of tags to be included on reports, conditions to produce risk or fraud reports, or currency preference.

12. The system of claim 11 wherein the processing parameters include: issuer routing information, acquirer routing information, merchant routing information, processing timeline, settlement window timeline, file preferences, stand-in parameters, data storage timeframe, recovery parameters, timeout parameters, failover conditions, or support staff contact information.

13. The system of claim 12 wherein the data relationship manager further queries the core database for issuer billing parameters associated with the processing parameters.

14. The system of claim 13 wherein the data relationship manager is further configured to bill the issuer for applying the processing parameters.

15. A computer readable medium, encoded with data and instructions, that when executed by a computing-device causes the computing-device to:
   receive financial transaction data;
   determine an issuer associated with the financial transaction data;
   query a subscription database for subscription data associated with the issuer, the subscription database being stored on a computer-readable medium, the subscription data associated with the issuer including data the issuer wishes to receive;
   query a core database for processing parameters associated with the issuer, the processing parameters associated with the issuer including parameters for processing the financial transaction data and the subscription data;
   apply the processing parameters to the financial transaction data and the subscription data; and
   update a customer exclusive data association database with the financial transaction data once the processing parameters are applied, the customer exclusive data association database including data specific to a customer associated with the financial transaction.

16. The computer readable medium of claim 15 wherein the financial transaction data contains field 55 data.

17. The computer readable medium of claim 16 wherein the computer readable medium is further encoded with data and instructions, that when executed by the computing-device causes the computing-device to:
   associate the field 55 data with a customer record in the customer exclusive data database, the customer exclusive database being stored on a computer-readable medium; and
   update the customer record with the associated field 55 data.

18. The computer readable medium of claim 17 wherein the subscription data includes: a list of reports, frequency of delivery, list of alerts and conditions under which they will be processed, transaction thresholds, preference data for customer contact, a list of loyalty programs, conditions for assigning rewards, a list of coupons, timeline for promotional periods, a list of data available to acquirers or merchants, a list of tags to be included on reports, conditions to produce risk or fraud reports, or currency preference.

19. The computer readable medium of claim 18 wherein the processing parameters include: issuer routing information, acquirer routing information, merchant routing information, processing timeline, settlement window timeline, file preferences, stand-in parameters, data storage timeframe, recovery parameters, timeout parameters, failover conditions, or support staff contact information.

20. The computer readable medium of claim 19 wherein the computer readable medium is further encoded with data and instructions, that when executed by the computing-device causes the computing-device to:
   query the core database for issuer billing parameters associated with the processing parameters.

* * * * *